March 4, 1969 T. A. FADNER 3,431,137
ELECTRIC FIELD POLYMERIZATION
Filed April 17, 1967 Sheet 1 of 7

INVENTOR
THOMAS A. FADNER

BY *Pennie Edmonds Morton*
*Taylor and Adams*

ATTORNEYS

INVENTOR
THOMAS A. FADNER

March 4, 1969 T. A. FADNER 3,431,137
ELECTRIC FIELD POLYMERIZATION

INVENTOR
THOMAS A. FADNER
BY
ATTORNEYS

FIG. 14

WEB FROM PREVIOUS STAGE

INVENTOR
THOMAS A. FADNER

BY *Pennie Edmonds Morton*
*Taylor and Adams*

ATTORNEYS 3,431,137
ELECTRIC FIELD POLYMERIZATION
Thomas A. Fadner, Rumford, Maine, assignor to Oxford Paper Company, New York, N.Y., a corporation of Maine
Continuation-in-part of application Ser. No. 289,606, June 21, 1963. This application April 17, 1967, Ser. No. 631,197
U.S. Cl. 117—93.1       6 Claims
Int. Cl. C08d *13/16;* B44d *1/44*

ABSTRACT OF THE DISCLOSURE

Polymeric resinous materials are deposited on a fibrous or porous substrate by subjecting a substrate-monomer system to an alternating electric field.

CROSS-REFERENCE TO RELATED APPLICATIONS

This application is a continuation in part of my prior application Ser. No. 289,606 filed June 21, 1963 now abandoned.

BACKGROUND OF INVENTION

This invention relates to the treating of a fibrous or porous web stock for improving or modifying its characteristics and better adapting it to its intended use. It provides an improved method and means for treating the web and also improved web products.

More particularly, the invention relates to the treating of a preformed porous substrate, for instance, a preformed paper web, with a polymerizable monomeric material under conditions which promote in-situ polymerization or copolymerization or graft polymerization, or some combination thereof, resulting in the formation of the corresponding polymeric or copolymeric material in or on the interstices of the web.

DESCRIPTION OF PRIOR ART

It has previously been proposed in the case of paper webs to incorporate a polymeric, resinous material in the paper by mixing the polymer with paper pulp, i.e., fiber slurry, and thereafter forming the paper web from the pulp mixture. The use of said procedure is subject to the objection that the preformed polymeric material is relatively expensive and, further, the presence of the resinous material in the pulp requires special handling procedures and severe modification of paper-making technology and machinery.

It has also been proposed to deposit the resinous material on preformed webs by means of graft polymerization of the monomer onto the web promoted by treating the preformed web with a catalytic material or promoter in aqueous or non-aqueous solution. Such methods have been subject to the objection that it involves a "wet step," that is, one where the fibers are wetted by water or other temporary liquid medium and a separate operation is therefore required for drying the web. Also, special equipment is required for carrying out these additional steps.

In an effort to avoid such difficulties and objections, it has been proposed to subject the web to irradiation, such as bombardment by ionizing particulate radiation or to ionizing electromagnetic radiation, for instance, alpha particles, beta rays, gamma rays, X-rays, accelerated electrons, thermal neutrons, accelerated deuterons, protons or the like, whereby active sites are generally developed throughout the web, and to bring a polymerizable monomer into contact with the web either prior to, or subsequent to, or during the irradiation treatment. Though the latter proposal avoids some of the objections of the other proposals, just mentioned, its use is subject to the serious objection that ionizing radiation, in "doses" sufficient to obtain desirable concentrations of polymerizing species has a destructive influence on the web. This method also suffers from the fact that a large percentage of the active sites formed by the irradiation exists within the web matrix itself (e.g. within the fibers of a paper web) and are therefore inaccessible to the monomer in the absence of a suitable swelling agent.

In addition to the above-noted objections, the previously proposed methods have been difficult to regulate and control. Accordingly, there has remained a need for a process for effecting deposition of polymeric material on a fibrous or porous web by in-situ polymerization of a monomer whereby the web can be manufactured by conventional methods, and the deposition carried within the confines of more or less conventional manufacturing equipment and which requires no additional rewetting and subsequent drying of the fibers and whereby the web is not subjected to the modifying or deleterious influence of ionizing radiation.

This need is met by my present invention, hereinafter described, which is predicated upon my discovery that in-situ polymerization or copolymerization of polymerizable monomeric material in and/or on a fibrous or porous web can be effectively promoted by means of an applied alternating electric field without resorting to the use of high energy ionizing radiation or to the swelling of the web.

SUMMARY OF INVENTION

In accordance with my present invention, polymerization is caused to take place within a fibrous or porous web by placing said web containing monomer between electrodes maintained co-extensive with the web surface and by maintaining between these electrodes an alternating electric field of sufficient strength to cause polymerization of the monomer molecules.

The electric field to be maintained is subject to considerable variation depending primarily upon the thickness of the web, the dielectric constant of the web and the thickness and dielectric constant of any other medium separating the electrodes. In any event, the electric field between the electrodes or more specifically in the vicinity of the web/monomer system, herein termed the reaction zone, must be adequate to initiate polymer formation within the reaction zone. The optimum average electric potential is readily determined by simple tests and may vary from several hundred volts up to thousands of volts but generally ranges above about 1000 volts.

According to my invention, the web being treated must be placed or passed between the electrodes, herein referred to as the process electrodes, in such a manner that one or both electrodes are separate from the web/monomer system by a material of higher dielectric strength than that of the web/monomer combination. That is, in the practice of my invention, the reaction zone must be separated from the electrodes by a dielectric material that does not undergo significant degradation when subjected to the electric field conditions.

I have found that for optimum results an alternating electric field should be maintained between the electrodes. The field may be generated by connecting the electrodes to a source of electric power of adequate voltage to induce initiation of polymer formation under the particular operating conditions and of adequate capacity to supply energy to the reaction zone at a convenient rate. For instance, I have employed a single voltage stepup transformer operating in the ordinary household frequency range, 60 cycles per second, or an ordinary spark coil such as that produced at one time for the ignition system of a Model T Ford. Alternately, I can employ a resonating power supply incorporating the process electrodes as an integral part of the power system. These power systems are described schematically in illustrations attached to this application.

DESCRIPTION OF PREFERRED EMBODIMENTS

Figure 1:
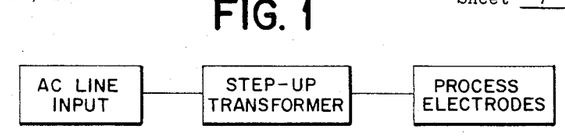
FIGS. 1, 1a and 1b show a schematic diagram and resulting voltage-time curve of a power supply system which can be used according to the invention.
Figure 1A:
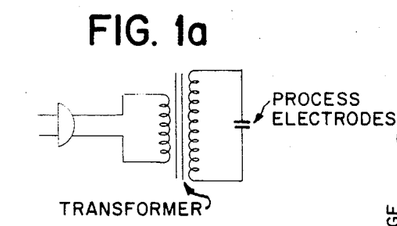
Figure 1B:
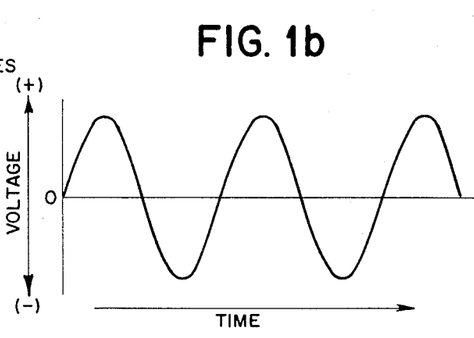
Figure 2:
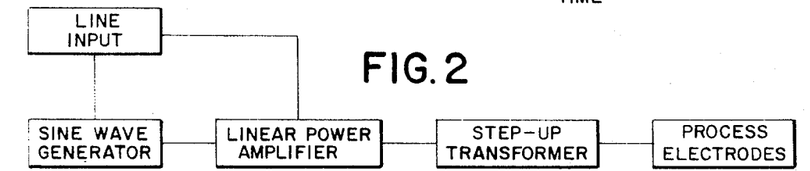
FIGS. 2 and 2a show a schematic diagram of a more preferred power supply system.
Figure 2A:
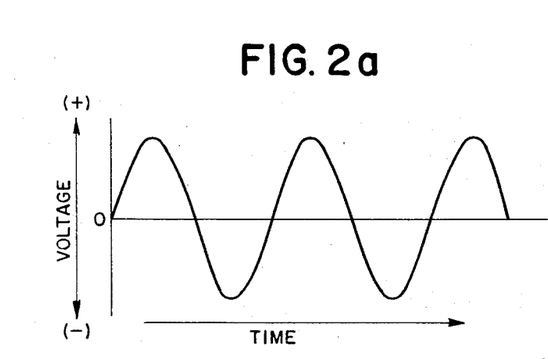
Figure 3:
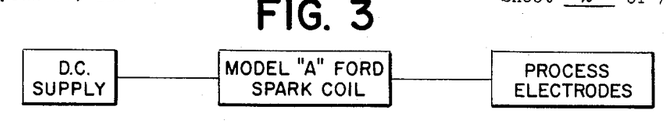
FIGS. 3, 3a and 3b show a schematic diagram of a pulsed power supply system which can also be used.
Figure 3A:
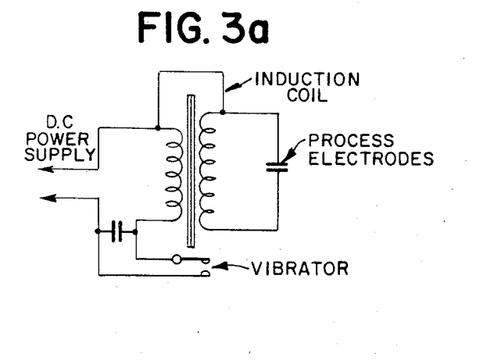
Figure 3B:
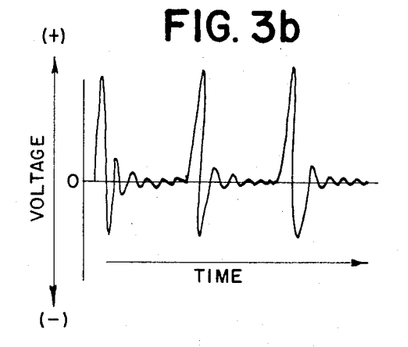
Figure 4:
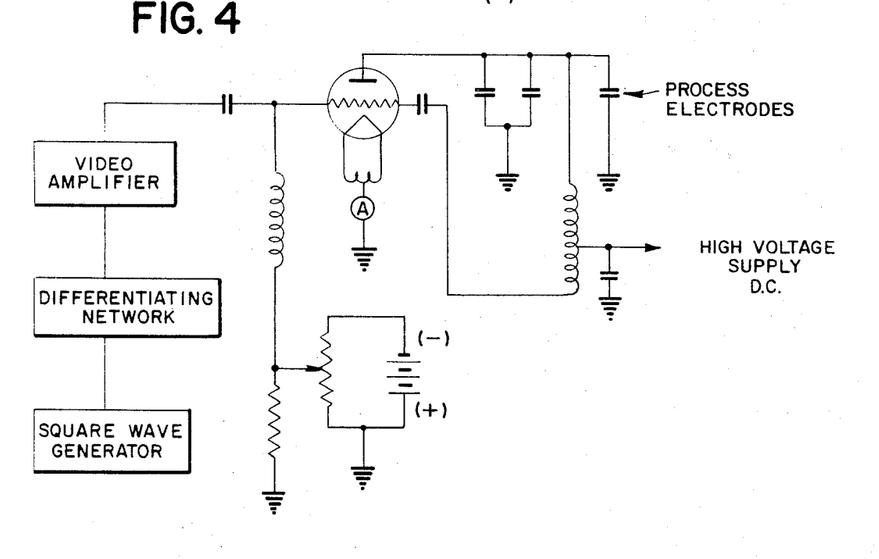
FIGS. 4, 4a, 5, 5a, 6 and 6a show schematic examples of parallel resonance power supply systems representing the most preferred systems for use according to the invention.
Figure 4A:
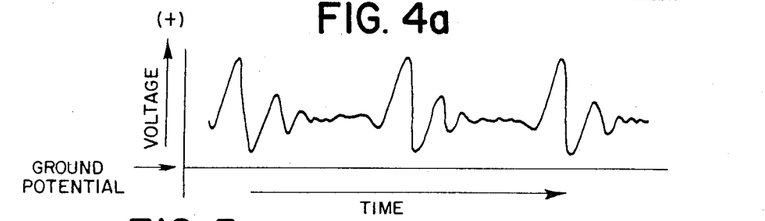
Figure 7:
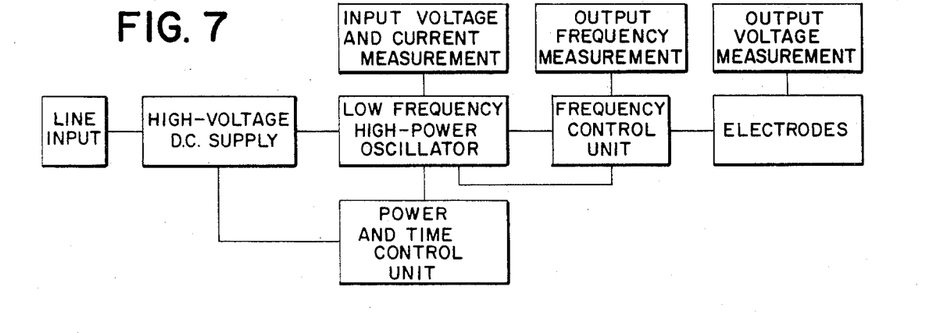
FIG. 7 is a block diagram of power supply components.
Figure 8:
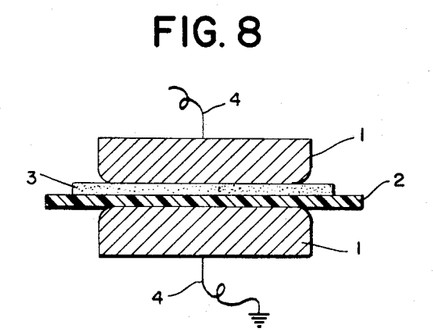
FIGS. 8, 9, 10, 11 and 12 show various alternative devices or processes utilizing dielectric materials for practicing the invention.
Figure 9:
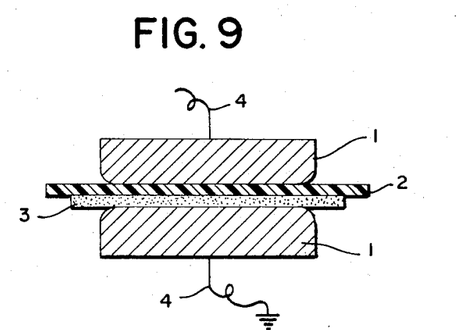
Figure 10:
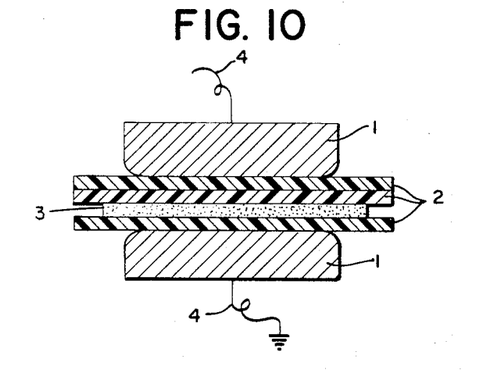
Figure 11:
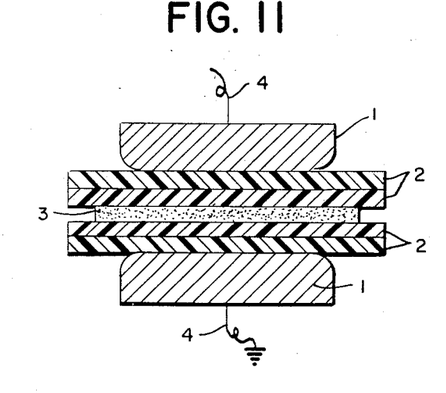

In FIGS. 1, 1a and 1b, I have indicated the components, schematic diagram and resulting voltage/time curve input to the process electrodes for a simple power supply system applicable to my invention. This system is limited to a single frequency, that of the AC line input and I would prefer to use a power supply system of the type shown in FIGS. 2 and 2a which incorporate a variable frequency sine wave generator, a power amplifier and a stepup transformer. Another useful power supply type is the pulsed power system illustrated in FIGS. 3, 3a and 3b. In this case a semi-mechanical oscillator is incorporated in the circuitry to produce power spikes or pulses. This system is particularly useful in that power is applied to the process electrodes intermittently, presumably allowing periods of polymer growth between each of the power pulses. Each of the preceding power supplies consist of commercially available units which when assembled as illustrated suffice as operable in my invention. However, I have found that I can obtain large increases in efficiency of power utilization by constructing power supply systems which incorporate the process electrodes as an integral part of the circuitry. Examples of these parallel resonance power supplies are illustrated in FIGS. 4, 4a, 5, 5a, 6 and 6a. FIG. 4 is representative of a damped oscillating parallel resonating system which produces power pulses similar to that of the FIG. 3 system but with which I can more conveniently vary the alternating frequency, voltage and pulse time. FIGS. 5, 5a, 6 and 6a illustrate types of power systems in which a pure sine wave input to the process electrodes is desired, operating either at ground or above ground as the zero potential. A block diagram, FIG. 7, best illustrates the general power system components useful to the practice of this invention. Circuitry as given in the preceding diagrams is known in the art of electronics and these are included as illustrative and not as restrictive to the claims of this invention.

I have found that the frequency of the applied electric field has relatively little effect on the polymerization of monomer by means of my invention provided that I adhere to the configurational and power characteristics outlined in this application. That is, for a given power input similar amounts of polymer are formed over the frequency range from as low as about 20 cycles per second to as high as about several megacycles per second. The lower limit is defined by the fact that an applied non-alternating electrical field for instance, a DC input applied to the electrodes, is not operable in the invention. I prefer to operate not much higher in frequency than several megacycles due to economic adversities of obtaining both high voltage and high frequency and also because power losses due to heating in the vicinity of the process electrodes increase with increasing frequency.

In one aspect of this invention, the monomer in liquid form, or a solution thereof, may be applied to the web as a coating or impregnant and the coated or impregnated web subjected to the electric field treatment just described. Where the monomer to be polymerized normally exists in the gaseous, rather than the liquid state, the monomer may conveniently be dissolved in a non-reactive liquid solvent or in a second liquid monomer prior to or during the electric field treatment.

This invention provides method and means whereby a preformed fibrous or porous web may be modified with respect to strength, opacity, water resistance, oil resistance, and other desirable properties may be imparted to the web, either through in-situ polymerization and depositing of the polymer in, or on, the web or through graft polymerization of the monomer with the web material or by a combination of these well-known polymer formation schemes. In the case of cellulosic webs, such as paper, a particular advantage of the process of my invention is that it may be readily applied to present paper manufacturing methods with a minimum disruption of current operating procedure and a minimum requirement of supplemental apparatus. Further, by my process, I can accurately control the extent of in-situ polymerization by variation in operating conditions at the will of the operator.

By selection of the appropriate monomer, a wide range of characteristics may be imparted to the web in accordance with this invention. For instance, in the production of paper offset printing plates, the plate and its image-life may be enhanced by forming a thin, chemically-bound, hydrophilic polymeric coating over a precoated, hydrophilic base, thus enhancing control of hydrophobic/hydrophilic balance on planographic printing plates. Also, in producing plastic coated paper, the invention is useful for forming a polymeric coating on the paper base to supply deformation necessary to smoothness and functional groups necessary for adhesion of subsequent conventional coatings.

The invention is also useful in forming smooth, glossy printing paper having the desired ink receptivity. It is further useful in producing highly opaque, thin paper webs by polymerization on the paper surface of an incompatible copolymer system which scatters large fractions of the incident light. It is also anticipated as useful in producing vapour barrier coatings such as polyethylene, polyvinylidene chloride or polytetrafluoroethylene formed, in-situ, on the web directly from the monomeric material. It is useful in the forming of thin polymer films on the paper stock for the purpose of curl control and for the formation of crosslinked films on either or both surfaces of the paper for increasing overall strength or for the formation of pressure sensitive adhesive coatings. It is also especially useful in the producing of composite packaging films by forming coatings having different coefficients of expansion or different permeability characteristics on opposite sides of the web.

In general, the characteristics of the fibrous web to be treated in accordance with the present invention do not appear to be critical, though webs of certain characteristics are better adapted to the treatment than others and this will vary with the particular treatment to be applied and the intended use of the finished product. For instance, due consideration should be given to the presence of high percentages or inorganic pigments on the surface of the paper which may materially influence the results obtained. The invention has, with advantage, been applied to both sized and unsized paper stocks, for instance filter paper which is unsized, uncoated and free from all ash-forming materials, starch-sized rawstock and the like. This invention is likewise applicable to any fibrous or porous web, for example, paper, felts, nonwoven fabrics, or woven fabrics or foams may be treated with monomers then exposed to a suitable electric field according to my invention to cause in-situ polymerization. The substrate may be composed of any of the common fibers. Cellulose, nylon, Dacron and polypropylene have all been successfully used as substrates, for instance, utilizing butyl acrylate as the monomer as described in the examples. There appears to be no limit to the type of material used in the web providing a sufficiently strong electrical field is maintained across the web.

Also, one is afforded a wide choice as to the particular monomer to be used in the process. The invention appears to be particularly suitable to monomeric materials whose polymers are classed as addition polymers and which are liquid or can be otherwise utilized in liquid form within the temperature range characteristic of this invention. Optimum process conditions, for instance temperature, time, power will vary with the specific monomer employed. Monomers which have been used with advantage include acrylic acid, methyl acrylate, ethylene acrylate, n-butyl acrylate, isobutyl acrylate, ethyl hexyl acrylate, acrylonitrile, methacrylic acid, methyl methacrylate, vinyl acetate, vinylidene chloride, styrene, alpha-methyl styrene, vinyl toluene, ethyl methacrylate, butyl methacrylate, lauryl methacrylate, stearoyl methacrylate, hydroxyethyl methacrylate, hydroxypropyl methacrylate, n,n'-diethylamino ethylmethacrylate, vinyl-n-butyl ether and methyl vinyl acetate.

It is usually desirable that the web be dry or substantially dry before being subjected to the treatment. It is not essential, however, that the web be completely devoid of moisture. In fact, a small amount of moisture may be desirable under some circumstances. Generally however, energy absorption by dipole rotation of water molecules induced by the electric field is not useful in promoting polymer formation. Therefore, in the practice of this invention, I prefer to maintain the moisture content in the reaction zone below about 5 percent by weight and preferably below about 2 percent.

Though no catalyst or promoter is required in the stock treated in accordance with my present invention, the invention also contemplates the inclusion in the reaction zone of materials which readily undergo dissociation under the influence of the applied electric field into species which cause, initiate or promote polymerization of the monomer.

In accordance with another aspect of the invention a gas is dispersed within the web/monomer matrix and the composite passed between the electrodes of the electric field chamber whereby initiator species are presumed formed within the gas phase of the reaction zone which in turn causes formation of polymer within the reaction zone. By this method of treatment, easily dissociable gases are exposed directly to the electric field treatment but unlike ordinary gas phase discharge treatments, the gaseous dissociated active species are formed in-situ and thereby brought immediately into contact with the polymerizable monomer. It is within the spirit of this invention to use normally gaseous monomers such as tetrafluorethylene or ethylene or gases such as oxygen, nitrogen, etc. as the dispersed gas phase.

An important variable in the process is the power density applied to the reaction zone since this influences the number of polymer-initiating species that are formed in a given unit of time and therefore the extent of polymer formation. Power density within the reaction zone is not readily measured. The power density in the reaction zone is controlled primarily by the dielectric nature of the web/monomer system being treated. I have found, however, that application of a potential gradient below a certain limiting value will not cause polymer formation. For instance, with the electrode configuration of FIG. 12 utilizing the parallel resonant power supply of FIG. 6, I have found that a minimum electrode potential gradient of 1300 volts (root mean square) per centimeter is required to cause significant polymer formation in the desired short periods of time. This value is included for illustrative purposes and should not be construed to be limiting since different dielectric systems or different power systems will result in a different value for the minimum potential gradient.

It is generally recommended that high concentration of reactants be employed and that polymerization temperature in excess of room temperature be used in order to expedite the rapid formation of polymer. It is not necessary that the electric field treatment or the polymerization be conducted under vacuum. Pressures ranging between a few millimeters of mercury to atmospheric pressure or above may be used, optimum pressure being dictated largely by other operating conditions and monomer characteristics. The presence of oxygen from the air, normally detrimental to polymer formation, appears to have no deleterious effect on the rate of polymer formation or on the general nature of the polymer molecules. Ordinary inhibitors of free-radical addition polymerization, such as hydroquinone, methyl hydroquinone and benzoquinone, have no observable effect. Similarly, materials which when caused to dissociate resulting in fragments which under conventional conditions initiate free-radical polymerization of the monomers referred to as useful in this invention, such as azobisisobutylonitrile or benzoyl peroxide, appear to have no effect on the results of my treatment when used as additives to the monomer.

The selection of the particular procedure to be employed in accordance with my present invention will depend primarily upon the type of web being treated and the characteristics which are desired to be imparted to the web. The selection of the particular procedure to be used will be influenced by whether formation of polymer within the web or formation of polymer on the surface or surfaces of the web is desired. This can be influenced by subjecting the web to prior coating, impregnating or similar techniques, to purposely limit the extent to which the monomer to be polymerized by the instant invention penetrates into the web to be treated. This can further be controlled by due consideration to the time involved for diffusion of monomer into the web between application of the monomer to the electrodes and completion of the electric field treatment as herein disclsed. Where the substrate is of a highly porous nature, considerable latitude in this respect is possible.

The reaction zone in my invention consists of the monomer saturated web typically maintained between layers of dielectric material co-extensive with the electrodes. The dielectric material must have a dielectric strength such that its minimum electrical breakdown potential at the operating frequency is greater than the voltage applied across the electrodes. For instance, when using paper of about 6 mils thickness saturated with one or more of the monomers described here, I have found that two layers of 1½ mil Mylar (Du Pont) (a polyethylene terephthalate) is generally adequate to fulfill this condition. The necessity for this condition is demonstrated by the fact that if breakdown does occur, such that a spark or arc traverses from one electrode to the other, no polymer formation is observed to take place. I have similarly employed mica, ceramic materials and Hypalon (Du Pont) (a chlorosulfonated polyethylene polymer) as useful dielectric materials.

The voltage that must be applied to cause polymer formation is dependent upon the thickness of the web, and the thickness of the dielectric. If the thickness of the reaction zone is increased by increasing the thickness of the web/monomer combination or if the thickness of the dielectric material is increased, the field gradient between the electrodes will diminish. However, I can return to the original reacting conditions by maikng the appropriate increase in the input voltage to the electrodes. Consequently, my invention appears not to be limited by specific dielectric film thicknesses or specific thicknesses of the web material within the reaction zone. For practical purposes I prefer to work with voltage inputs of less than about 10,000 volts, since the size and cost of the electrical components increase rapidly with the voltage input requirements. This preferred voltage range corresponds to a total thickness of up to about 60 mils of web, monomer and dielectric material maintained between the electrodes. These particular values of voltage and thickness should not be construed to be limiting to the spirit of the invention but are included to illustrate that my invention appears not to be limited by specific dielectric or reaction zone dimensions.

I have found that although the dielectric layer is necessary to the practice of my invention, its particular location within the reaction zone is unimportant as long as it remains co-extensive with the electrode surfaces. Thus, I have located the necessary dielectric material on one side of the web next to either the ground electrode or to the high potential electrode with no differentiable effect on polymer formation. Similarly, I have sandwiched the dielectric material between two webs to be treated and conversely sandwiched the web to be treated between two layers of dielectric with no noticeable difference in the results of the process.

These configurations are better ilustrated by reference to FIGS. 8 through 12, which are self explanatory. The components referred to therein are described elsewhere in this application. FIG. 13 illustrates an enlarged view of a usual configuration at the electrode wherein a gas has been dispersed within the reaction zone.

The polymer formation on and/or in the web will include homopolymers as well as graft polymers or copolymers, the type and amount of polymer formed depending largely upon the particular procedure used, the monomer or monomers being employed and the nature of the web being treated. The extent of graft polymerization to the web fibers will be influenced primarily by the number of active sites formed on the fibers and that, in turn, will be influenced primarily by the electric field power absorption in the reaction zone. As previously noted, the power absorption in the reaction zone will in turn, depend upon the dielectric constant of the substrate and of any other materials maintained between the electrodes and on the thickness of the dielectric and on the potential applied across the electrodes. The energy thus applied to the fibrous web substrate is subject to control by application of the methods and materials herein described.

It will be understood that reference in the appended claims to in-situ polymerization of a monomer is intended to include graft polymerization of the monomer with the cellulose, homopolymerization of the monomer and copolymerization with other monomers or polymers which may be present.

The weight of polymer which adds onto the web being treated by means of my invention may be varied over a considerable range by variation in operating conditions, including power density, dwell time of the web between the electrodes and amount of monomer applied to the web.

Further control of the amount of polymerized monomer added to the web can be gained by leading the treated web into a chamber placed immediately subsequent to the electrodes within which is maintained a non-reactive atmosphere and which is controlled at a temperature conducive to rapid completion of the polymerization reaction. In cases where it is desired to provide a heavier pickup of polymer than that which can be readily obtained by a single pass through the process, the web may be subjected to repeated treatments. For instance, several units may be arranged in tandem, each unit comprising the electrodes with or without a subsequent chamber and with or without separate monomer exposure. Similarly, multiple passes arranged in tandem may, with advantage, be employed where it is desired to treat the opposite sides of the paper web with a different monomer or to apply coatings of different weights to the respective sides of the web or by consecutive exposures of the same side of the web to different monomers.

Many useful systems for treatment of continuous webs by means of my invention can be designed, several of which are shown in FIGS. 14, 14a, 15 and 16. These are self-explanatory and included by way of illustrating the utility of the invention and should not in any way be construed to be limiting.

Figure 17:
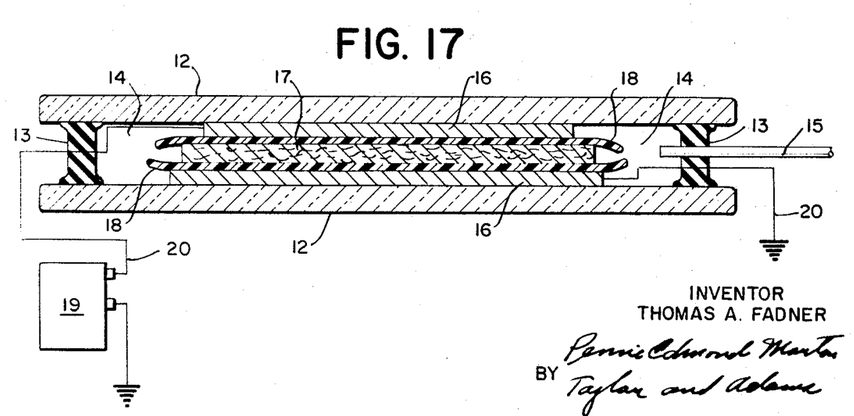

An apparatus suitable for demonstrating the nature of my invention and used in carrying out certain of the following specific examples was substantially as shown in the accompanying drawing FIG. 17 comprising two sheets of plate glass 12 separated by compressible rubber gaskets 13, forming a sealed chamber 14, adapted to be evacuated through conduit 15, leading from the chamber to a vacuum pump. Positioned within the chamber 14, in close proximity to the respective delineating glass plates, are two aluminum plate electrodes 16, between which there is positioned the cellulosic paper web 17 to be treated, sandwiched in between two polyethylene plastic films 18. An electric field is applied across the electrodes from a suitable source of high voltage alternating electric power 19, by means of leads 20. In this laboratory size apparatus illustrated, I have, with advantage, used as the power source a spark coil of the type previously used in Model T Ford automobiles and capable of applying across the electrodes an intermittent potential of about 5000 volts at a frequency of several hundred cycles per second.

Example I

A series of tests was run using as the substrate a cellulosic paper known to the industry as Whatman No. 4 filter paper having a weight of 55 pounds per ream of 3300 sq. ft. In each test, a circular sheet of the paper, 12.5 centimeters in diameter, was impregnated with 1 cc. of one of the monomers hereinafter identified, and the impregnated paper placed between two sheets of polyethylene film and the composite placed in a horizontal plane between two aluminum electrodes (0.008 inch aluminum), the top electrode, for convenience, having been cut to the same size as the filter paper and the bottom electrode being slightly larger. The paper substrate was 0.069 inch thick and the thickness of each of the polyethylene sheets was 0.042 inch. The electrodes were positioned in direct contact with the respective sheets of polyethylene; consequently, the spacing between the electrodes was approximately 0.15 inch.

The system was evacuated to an extent adequate to cause a close sandwiching of Mylar, paper and electrodes similar to that illustrated in FIG. 17. A potential of about 5000 volts was applied across the electrodes for approximately 10 minutes, during which period a current of about 20 milliamperes ($10^{-6}$ amperes), as determined by a vacuum-tube volt meter was measured across the electrodes which corresponds to a current density equivalent to about 0.16 milliampere per square centimeter, between the electrodes within zone of reaction.

The treated paper was then removed and placed in an oven and heated to evaporate any residual monomer remaining in the paper. The specimen was then conditioned to room temperature and humidity, weighed and its weight compared with the original weight of the sample in order to determine the amount of polymer formed thereon. The identity of the monomer used in the respective tests and the percent of the polymer formed, based on the increase in weight of the treated specimen, are set forth in the following tabulation:

TABLE I

| Monomer: | Percent polymer |
| --- | --- |
| Acrylic acid | 45 |
| Methyl acrylate | 10 |
| Ethyl acrylate | 30 |
| n-Butyl acrylate | 19 |
| Isobutyl acrylate | 50 |
| Ethyl hexyl acrylate | 34 |
| Acrylonitrile | 19 |
| Methacrylate acid | 15 |
| Methyl methacrylate | 6 |
| Vinyl acetate | 6 |
| Vinylidene chloride | 5 |
| Styrene | 6 |
| α-Methyl styrene | 5 |
| Vinyl toluene | 10 |

Example II

Following the procedure of the preceding example, the paper substrate was impregnated with acrylic acid and after treatment as described showed a weight increase of 41%. Under similar conditions, using a styrene monomer, the penetrated substrate was subjected to a second treatment which resulted in an additional weight increase of 4%.

Example III

Using the procedure of Example I, the paper substrate was impregnated with a mixture of ethylene glycol dimethacrylate and ethyl acrylate. Following the treatment, the paper was found to contain crosslinked copolymers equivalent to a weight increase of 21%. In a similar operation, using divinyl benzene and styrene, a crosslinked copolymer equivalent to a 4% increase in weight was formed. Upon extraction with toluene, a residue remains on the paper which rendered it water repellent, despite the extraction of the major portion of the copolymer, as evidenced by the weight loss caused by the extraction.

Example IV

As an illustration of the application of several successive layers of polymer on a paper substrate, in accordance with the present invention, the filter paper was treated 5 times with styrene, each followed by 10 minutes of electric field treatment, as described in Example I. The weight of the original paper substrate and of the specimen following each of the treatments is set forth in the following tabulation:

TABLE II

| | Grams |
| --- | --- |
| Before treatment | 1.1051 |
| Following 1st treatment | 1.1448 |
| Following 2nd treatment | 1.1734 |
| Following 3rd treatment | 1.2100 |
| Following 4th treatment | 1.2305 |
| Following 5th treatment | 1.2328 |

For comparative purposes treatment was similar and of equal duration in each of the foregoing examples.

Example V

Figures 5, 5A, 6, 6A:
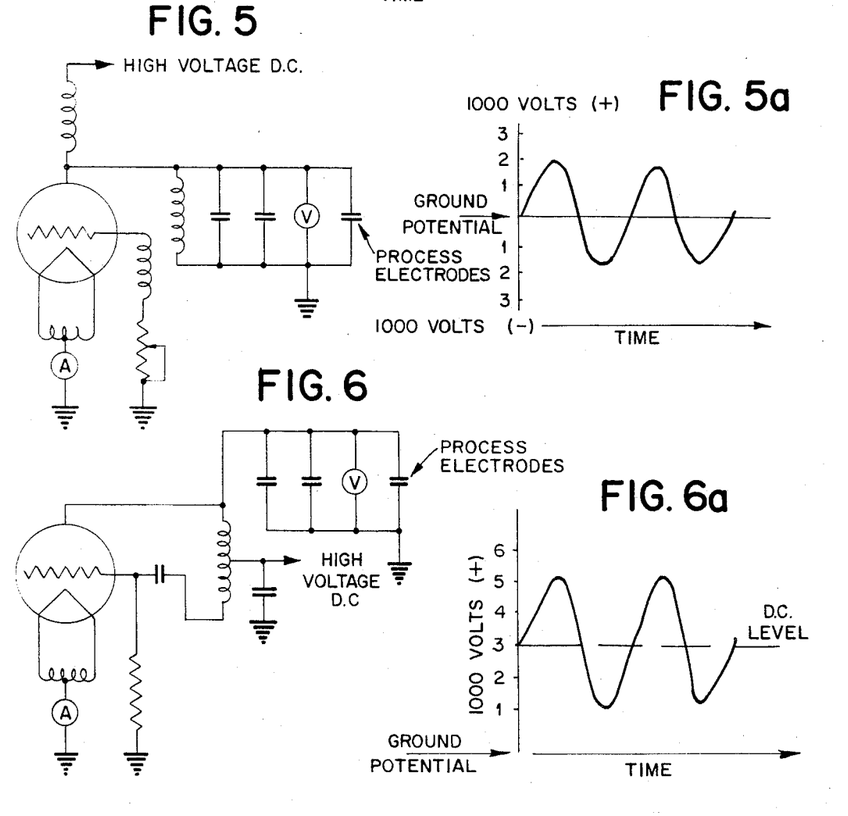
Figure 12:
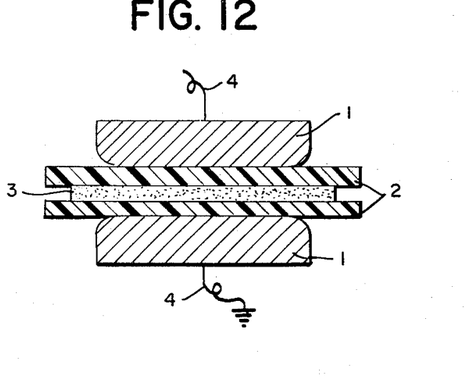
Figure 13:
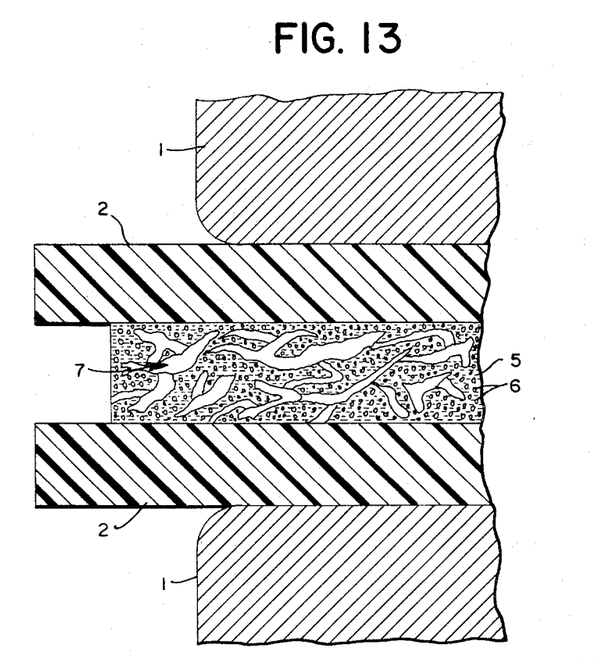
FIG. 13 is an enlarged view showing the monomer phase within a porous substrate or web.
Figure 14:
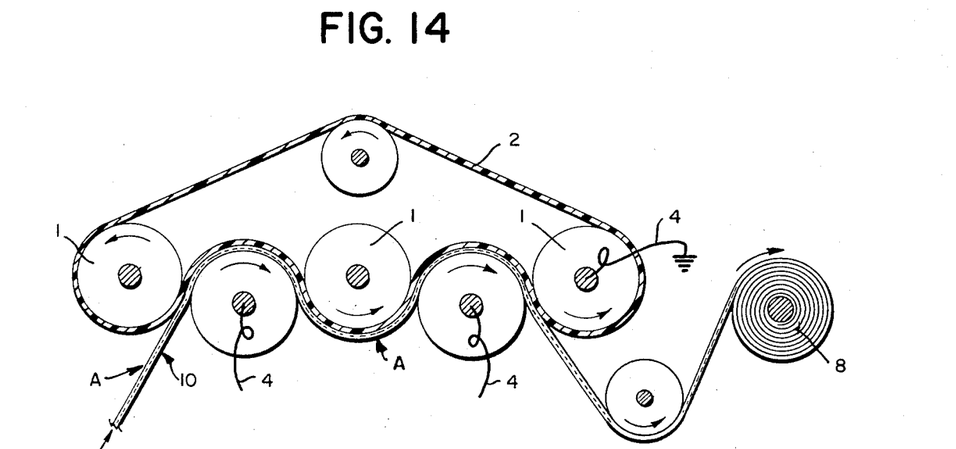
FIGS. 14, 14a, 15, 16 and 17 show further alternative systems by which the invention can be practiced.
Figure 14A:
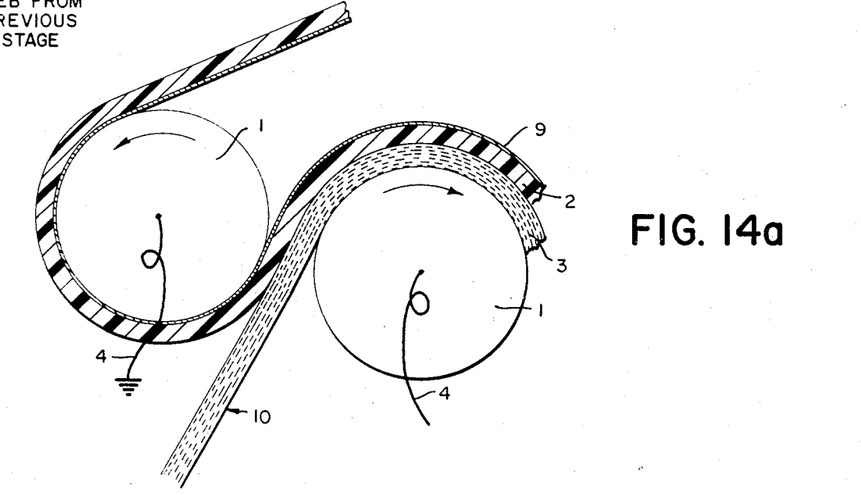
Figure 15:
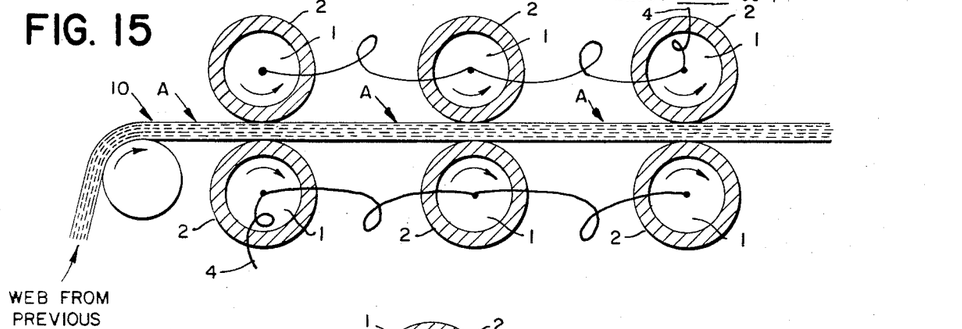
Figure 16:
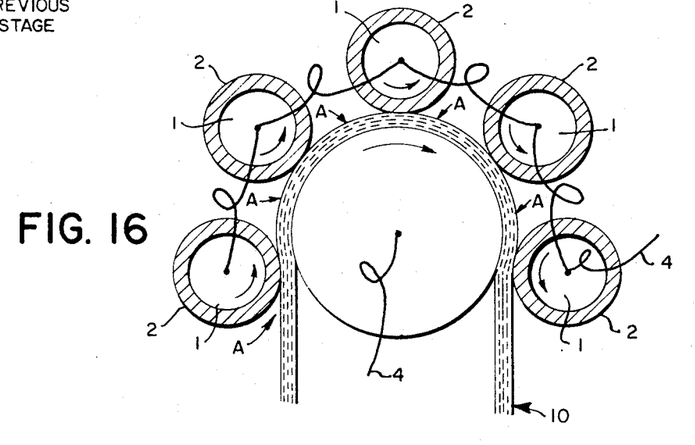

As an illustration of the application of this invention to a variety of fibrous webs, a procedure similar to Example 1 was applied to the webs listed in Table III except that the power supply of FIG. 6 and the electrode configuration of FIG. 12 were used. The monomer employed in this case was butyl acrylate with a residence time of 30 seconds in the reaction zone.

TABLE III

Monomer: Butyl acrylate
Time: 30 seconds
Temperature: Room temperature

| Substrate: | Percent polymer |
| --- | --- |
| Nylon N [1] | 21.5 |
| Polymax B [2] | .04 |
| Polymax B [2] | .8 |
| Dacron DAC [3] | 2.1 |
| Whatman No. 1 filter paper [a] | 15.3 |
| Unbleached saturating paper [b] | 2.7 |
| Cotton cloth | 6.7 |

[1] A polyamide supplied by National Filter Media Corp.
[2] A butyl acrylate polymer emulsion supplied by National Filter Media Corp.
[3] A Du Pont polyester.
[a] W. R. Ralston, Ltd.
[b] Brown Co.

Example VI

Approximately 3 grams of ethylacrylate monomer containing 15 parts per million methyl hydroquinone was added to a 10 square inch sample of an 8–11 mil glass fiber mat (No. 29 Whatman) and sandwiched between two sheets of 1.5 mil Mylar and the composite placed between the electrodes as illustrated in FIG. 12. The temperature of the electrodes was maintained at about 60° C. while a 2.5 kilovolt (root mean square), 3 kilocycle alternating potential was applied for 60 seconds to the electrodes from an audio amplifier power source similar to that described schematically in FIG. 2. In a series of seven experiments as just described, an average increase in weight of 23% was observed attended with a large increase in tensile strength of the glass mat.

I claim:

1. In the process for depositing a polymeric resinous material onto or into a porous pre-formed fibrous sheet or web by in situ polymerization of a monomer polymerizable by the application of an alternating electric field, the steps of (1) placing said monomer onto and into said web; (2) placing said web containing monomer between layers of a dielectric material and having dimensions substantially coextensive in dimensions with the porous web; (3) placing the resulting layers of dielectric material and porous web containing monomer between two metal electrodes coextensive in width with the web; (4) applying the alternating electric potential to said electrodes sufficient to cause polymerization of said monomer; (5) said dielectric material having a higher dielectric strength than that of the web-monomer combination.

2. The process of claim 1 in which the web is continuously passed between the dielectric layer and the electrodes.

3. The process of claim 1 in which the web and the dielectric layer are continuously placed through the electrodes.

4. The process of claim 1 in which at least two different monomers are mixed to form a liquid mixture and applied to the web.

5. The process of claim 2 in which the web is subjected to repeated monomer applications and the alternating electric field potential treatment applied as the web progresses, whereby additional in situ polymerization is effected.

6. The process of claim 1 in which the web is a cellulosic paper web.

References Cited

UNITED STATES PATENTS

| | | | |
|---|---|---|---|
| 2,834,055 | 5/1958 | Akerlof | 204—168 X |
| 3,068,510 | 12/1962 | Coleman | 204—165 X |
| 3,155,629 | 11/1964 | Tobin | 204—165 X |
| 3,246,054 | 4/1966 | Guenther et al. | 117—93.31 X |
| 3,287,242 | 11/1966 | Tobin | 204—165 |

ALFRED L. LEAVITT, *Primary Examiner.*

J. H. NEWSOME, *Assistant Examiner.*

U.S. Cl. X.R.

117—155; 204—170